United States Patent
Jürgensen et al.

(10) Patent No.: US 6,862,314 B1
(45) Date of Patent: Mar. 1, 2005

(54) RECEIVER ARCHITECTURE FOR A MULTI SCRAMBLING CODE TRANSMISSION CDMA TECHNIQUE

(75) Inventors: Jens-Uwe Jürgensen, Fellbach (DE); Richard Stirling-Gallacher, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/420,720

(22) Filed: Oct. 20, 1999

(30) Foreign Application Priority Data

Oct. 23, 1998 (EP) .......................................... 98120115

(51) Int. Cl.[7] .............................................. H04J 13/00
(52) U.S. Cl. ................................................... 375/142
(58) Field of Search ................................ 375/130, 140, 375/142, 150, 136, 143, 147, 152; 370/335, 342, 479; 380/268, 252, 255, 42

(56) References Cited

U.S. PATENT DOCUMENTS

| | | | | |
|---|---|---|---|---|
| 5,151,919 A | * | 9/1992 | Dent .............................. 375/1 |
| 5,414,728 A | * | 5/1995 | Zehavi ....................... 375/200 |
| 5,515,396 A | | 5/1996 | Dalekotzin .................. 375/206 |
| 6,005,887 A | * | 12/1999 | Bottomley et al. ......... 375/207 |
| 6,075,808 A | * | 6/2000 | Tsujimoto .................... 375/143 |
| 6,222,875 B1 | * | 4/2001 | Dahlman et al. ........... 375/200 |
| 6,307,868 B1 | * | 10/2001 | Rakib et al. ................. 370/485 |
| 6,389,000 B1 | * | 5/2002 | Jou ............................... 370/342 |
| 6,389,058 B1 | * | 5/2002 | Lee et al. .................... 375/141 |
| 6,483,866 B1 | * | 11/2002 | Suzuki ........................ 375/149 |
| 6,493,379 B1 | * | 12/2002 | Tanaka et al. .............. 375/150 |
| 6,501,747 B1 | * | 12/2002 | Friedlander et al. ........ 370/342 |
| 6,570,889 B1 | * | 5/2003 | Stirling-Gallacher et al. .... 370/479 |

FOREIGN PATENT DOCUMENTS

EP     0 717 520 A2     6/1996     ............ H04J/13/00

* cited by examiner

*Primary Examiner*—Mohammed Ghayour
*Assistant Examiner*—Dung X. Nguyen
(74) *Attorney, Agent, or Firm*—Frommer Lawrence & Haug LLP; William S. Frommer; Bruno Polito

(57) ABSTRACT

To provide a higher data rate service on one link, it is possible to use more than one scrambling code per link. In this way, the same channelization code can be reused and a higher data rate can be supported because the highest data rate is restricted by the set of channelization codes with the shortest length. When reusing one and the same channelization code for spreading the two different data streams transmitted in one link and scrambling these two data streams by two different scrambling codes, the complexity of the receiver will be reduced. Therefore, the two data streams are spread with one and the same channelization code. After this, each of these data streams is scrambled with a different scrambling code.

10 Claims, 6 Drawing Sheets state of the art

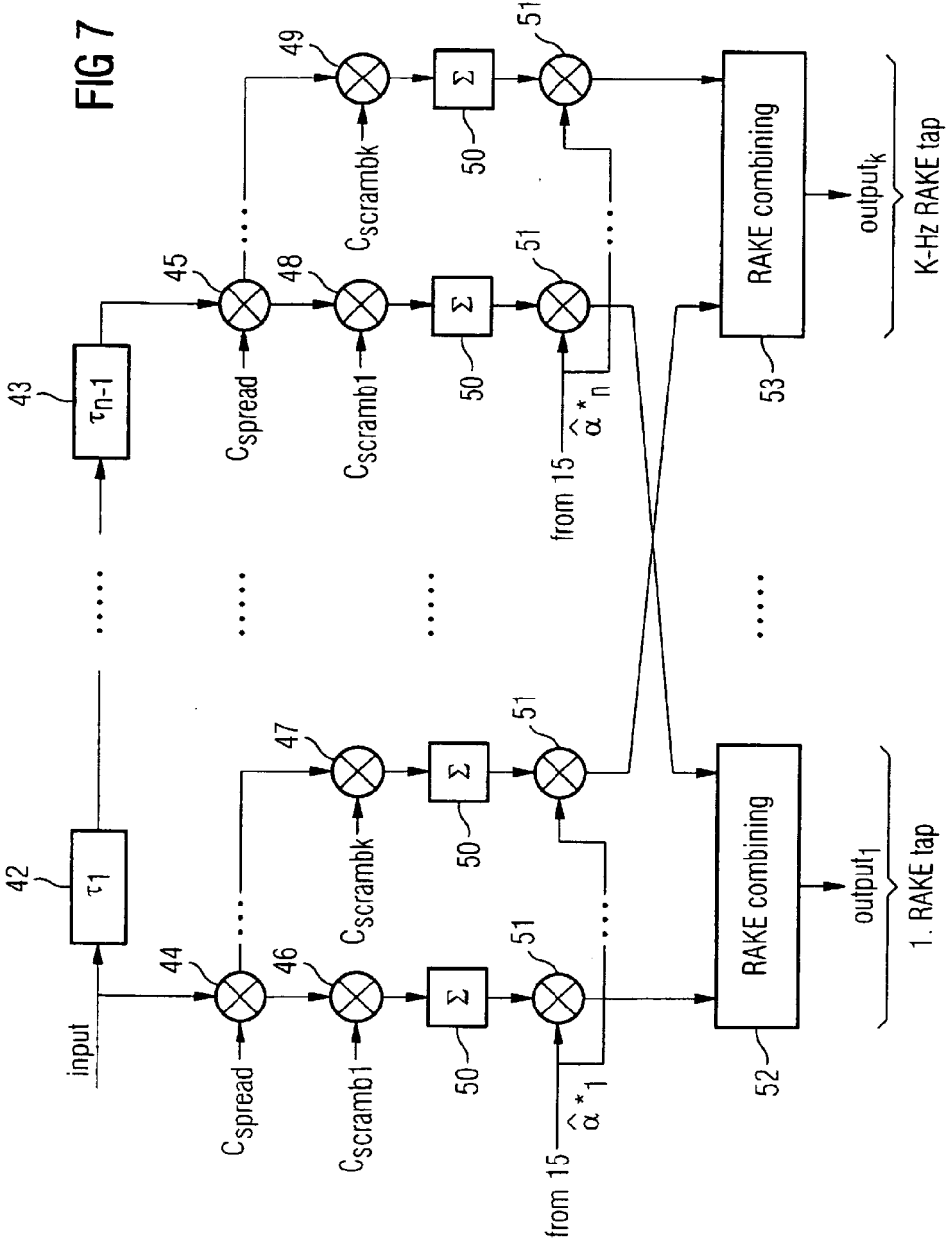

RECEIVER ARCHITECTURE FOR A MULTI SCRAMBLING CODE TRANSMISSION CDMA TECHNIQUE

The present invention relates to a receiver and a receiving method for detecting information symbols transmitted according to a CDMA technique, wherein the information symbols have been respectively spread with an identical spreading code and scrambled with different scrambling codes.

CDMA (Code Division Multiple Access) transmitting systems are known from the state of the art. According to one CDMA technique, after the modulation (symbol mapping), the symbols are spread by a so-called spreading sequence or spreading code. After spreading the resulting data stream is scrambled by a scrambling sequence or a scrambling code. The thus resulting data stream, which has been spread and scrambled, is then power-amplified and sent over a communication channel. The reverse procedure is effected at the receiving side.

Figure 3:
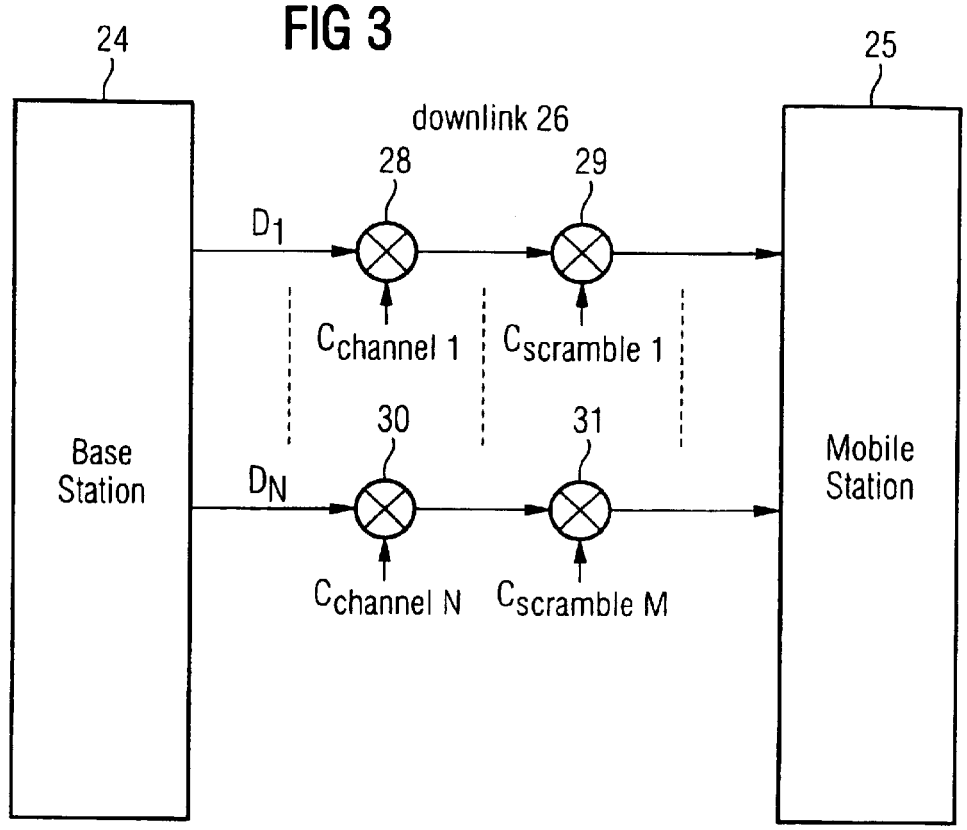

In FIG. 3 an example for a transmission system comprising scrambling and spreading is shown. In the example of FIG. 3 only the downlink communication channel 26 from a base station 24 to a mobile station 25 is shown. The downlink 26 can comprise different channels $D_1, \ldots, D_{N'}$. Each channel comprises channelisation (spreading) 28, 30 and scrambling 29, 31. According to the state of the art in one link, as for example the downlink 26 as shown in FIG. 3, only one scrambling sequence (scrambling code) and several different spreading codes (often referred to as channelisation codes) are used depending upon the data rate and services required. The drawback of this approach is that only certain types of channelisation codes can be used together and the highest data rate is constrained by the length of the shortest channelisation code. This is especially true when codes of different rates are used.

From WO96/05668 A1 and EP-A-565 506 techniques for multiple access coding for radio communication is known. According to these documents information symbols are spread using orthogonal or bi-orthogonal code words. This spread information symbols are assigned a unique scramble mask that is taken from a set of scramble masks having selected correlation properties. The set of scramble masks is selected such that the correlation between the modulo-2 sum of two scramble masks with any codeword is a constant magnitude independent of the codeword and the individual mask being compared. According to one embodiment of WO 96/05668 A1, when any two masks are summed using modulo-2 sum arithmetic, the Walsh transformation of that sum results in a maximally flat Walsh spectrum. For cellular radio telephone systems using subtractive CDMA demodulation techniques, a two-tier ciphering system ensures security at the cellular system level by using a pseudorandomly generated code key to select one of the scramble masks common to all of the mobile stations in a particular cell. As according to these techniques one common scramble mask is used for all mobile stations in a particular cell, the above-cited drawback arises that only certain types of channelisation codes can be used together limiting the number of available channelisation (spreading) codes.

The generation of spreading codes by a code tree is known from Adachi, "Tree-structured generation of orthogonal spreading codes with different lengths for forward link of DS-CDMA mobile radio", Electronics Letters, January 1997, Vol.33, No.1, page 27, 28.

A RAKE receiver is for example shown and explained in U.S. Pat. No. 5,677,930. Therefore regarding the principles of the RAKE receiving technology and the meaning of the specific expressions such as "RAKE tap" etc. reference is made to said document.

Figure 8:
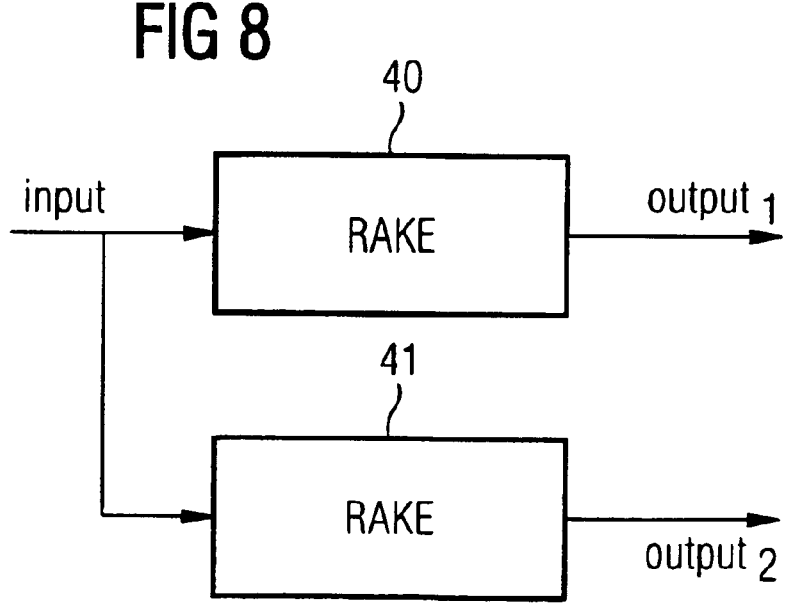

FIG. 8 shows a receiving technique known from the prior art. It is assumed that one scrambling code and a plurality of spreading codes is used to transmit data according to a CDMA technique. Therefore received data is passed to a plurality of RAKE receivers 40, 41. The provision of a plurality of RAKE receiver, however, represent a disadvantage regarding the complexity and thus the producing costs of the entire receiver structure.

All known receiver techniques can only cope with transmission systems utilizing only one scrambling code within one link (uplink or downlink). The present invention, however, deals with CDMA transmission systems utilizing two or more scrambling codes within one link for which up to now no receiver structure has been proposed in the state of the art.

Therefore it is the object of the present invention to provide for a receiving technique adapted to cope with CDMA transmission systems utilizing one spreading codes and two or more scrambling codes within one link (uplink or downlink).

The object as set forth above is achieved by means of the features of the independent claims. The dependent claims develop further the central idea of the present invention in a particularly advantageous manner.

Therefore, according to the present invention, a receiver for detecting information symbols transmitted according to a CDMA technique is provided, wherein the receiver is adapted to cope with received information symbols which have been spread with identical spreading codes and scrambled with different scrambling codes. The receiver thereby comprises a modified RAKE receiver.

According to the present invention furthermore a mobile telecommunications device is provided comprising a receiver as set forth above wherein the mobile telecommunications device can be a portable mobile station.

According to the present invention furthermore a method for receiving and detecting information symbols transmitted according to a CDMA technique is provided. A method is adapted to cope with the information symbols which have been respectively spread with an identical spreading code and scrambled with different scrambling codes.

According to the method of the present invention a plurality of descrambling steps is provided for descrambling an input data bit stream respectively with different descrambling codes. In a modified RAKE receiving step the output of the despreading step is passed to a number of parallel streams which are then multiplied by the different number of parallel streams which are then multiplied by the different descrambling codes before multiplication by the estimated channel coefficients. The number of RAKE receiver outputs therefore corresponds to the number of scrambling codes used.

Further aspects, advantages and features of the present invention will now be explained by means of embodiments of the present invention and with reference to the enclosed figures of the drawings.

Figure 1:
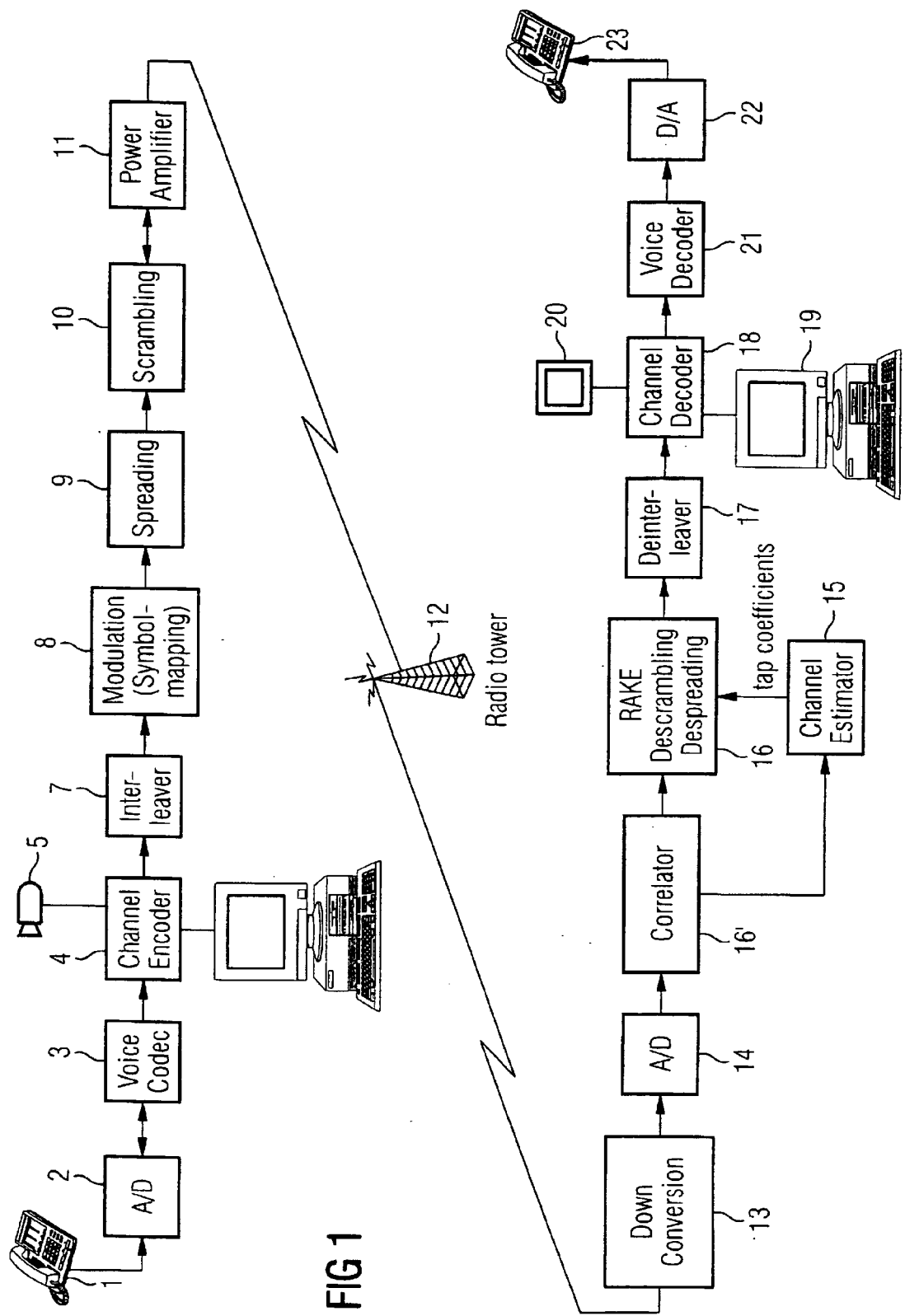
Figure 2:
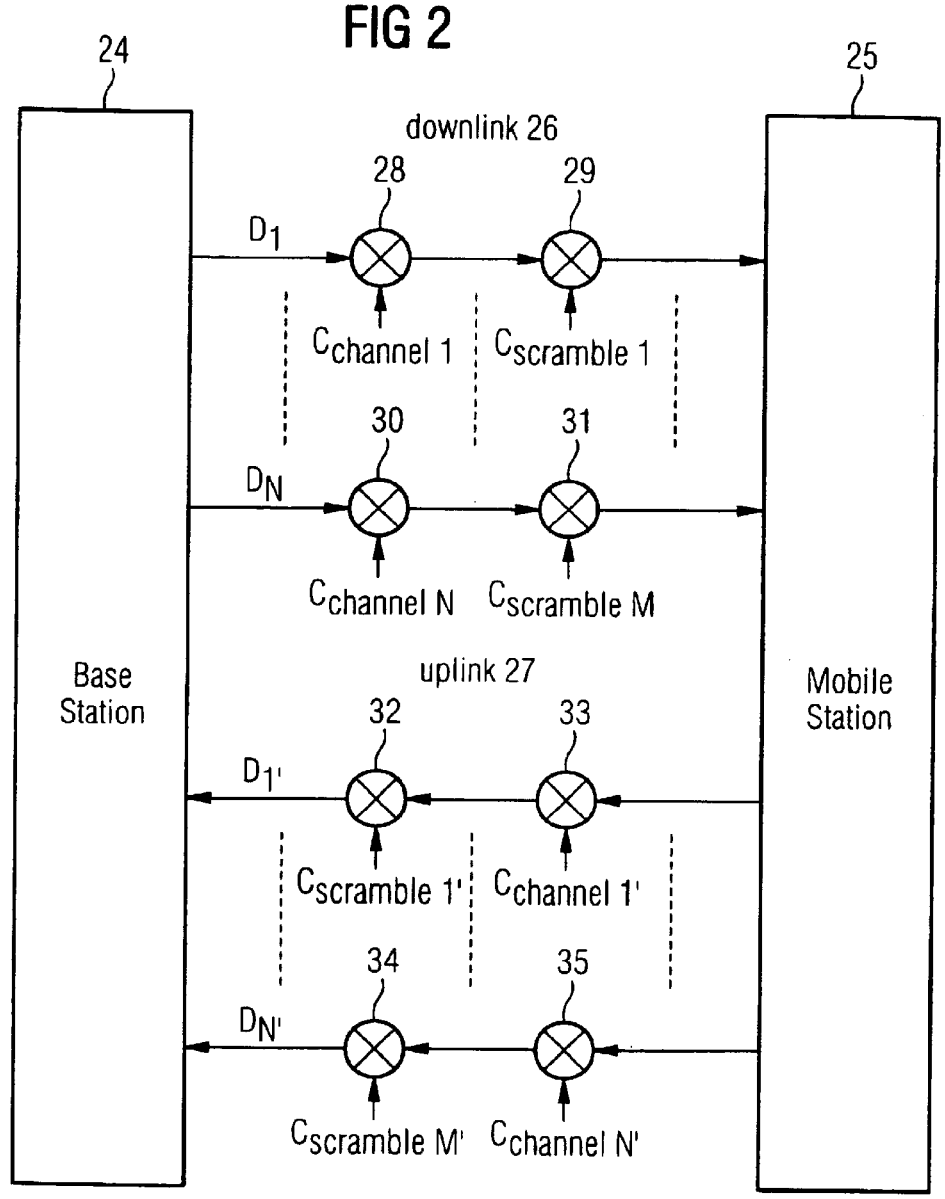
Figure 4:
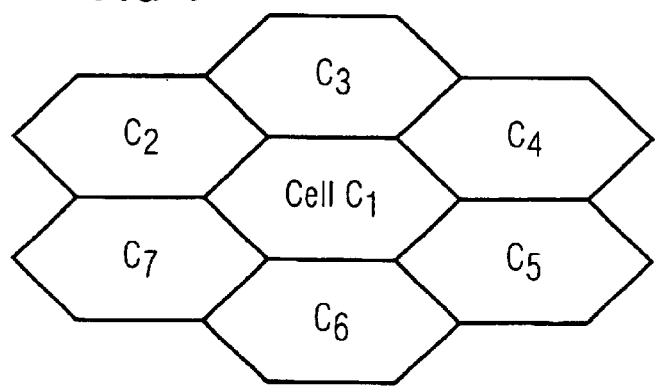
Figure 5:
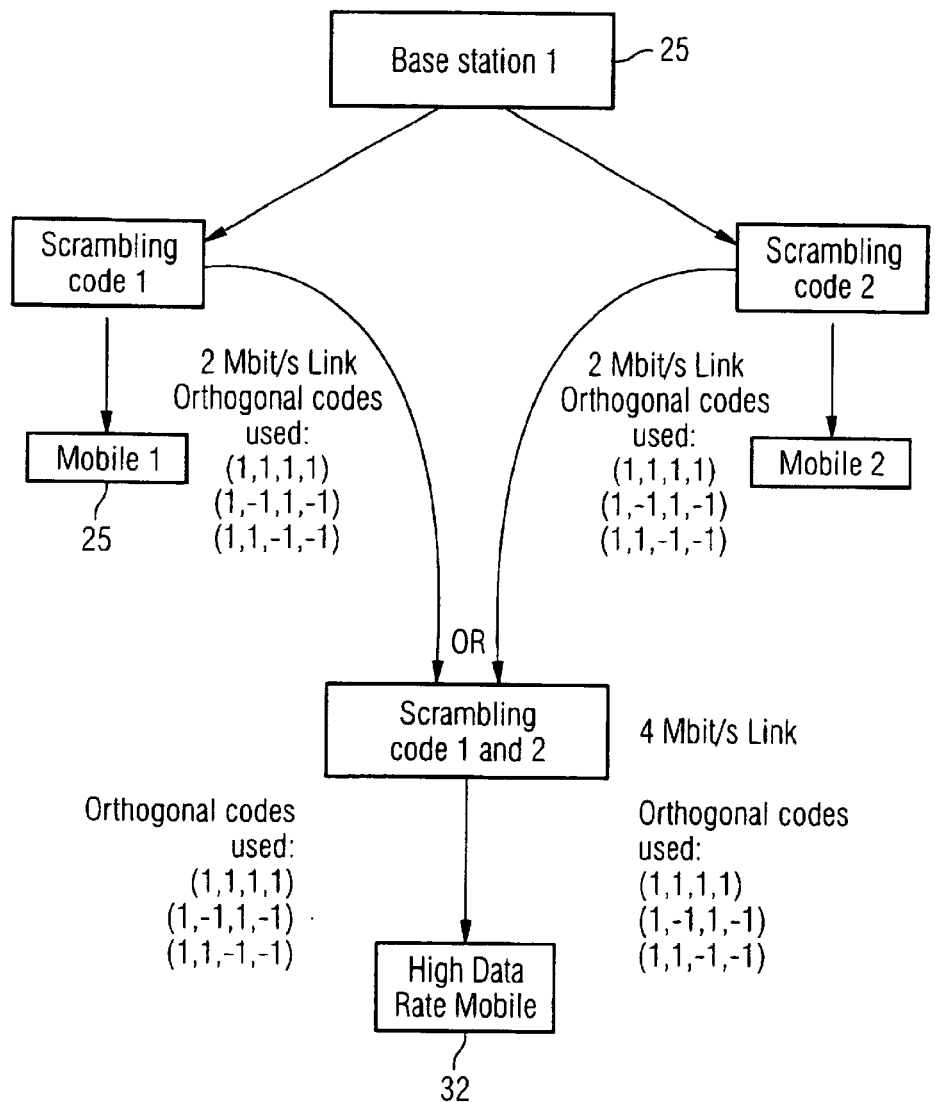
Figure 6:
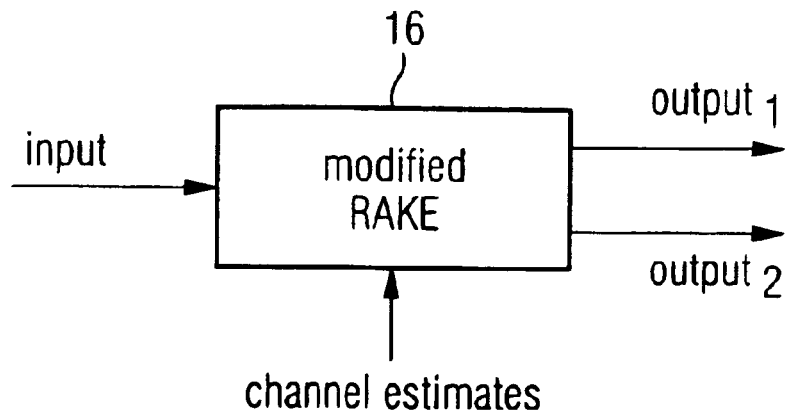

FIG. 1 shows a general view of a wireless transmission system,

FIG. 2 shows the spreading and scrambling respectively for a downlink communication channel and a uplink communication channel between a base station and a mobile station of the wireless transmission station as shown in FIG. 1, FIG. 3 shows the channelisation (spreading) and scrambling in a downlink communication channel between a base station and a mobile station according to the prior art, FIG. 4 shows the plurality of cells in the transmission system, FIG. 5 shows an application of the present invention to provide for higher data rate services, FIG. 6 shows a receiver according to the present invention designed for a multi scrambling code CDMA technique, FIG. 7 shows the internal structure of a RAKE receiver modified according to the present invention, and FIG. 8 shows a known receiver for a CDMA technique utilizing a plurality of spreading codes and only one scrambling code per link.

A transmission system according to the present invention will now be explained generally with reference to FIG. 1. As shown in FIG. 1, different data can be transmitted in a wireless manner. The data to be transmitted can comprise voice data from a telephone 1, 23, digital video data, for example, from a video camera 5 to be transmitted to a monitor 20 and other digital information data, as for example, data from a computer 6 to be transmitted to another computer 19. The analog voice data from a telephone 1 are A/D-converted 2, voice coded 3 and then supplied to a channel encoder 4. The data, for example, from a video camera 5 or from the computer 6 are also supplied to the channel encoder 4. The different data, for example, the voice data and the video data can be transmitted simultaneously. The data from the channel encoder 4 are given to a interleaver 7 and then supplied to a modulator 8 providing for a symbol mapping. The modulated data from modulator 8 are then spread 9 and scrambled 10, which will be explained later on in detail. The spread and scrambled data are amplified 11, and then transmitted over a wireless transmission path 12.

On the receiving side, the received data bit stream is downconverted in a baseband downconvertor 13. The downconverted data output from the baseband downconvertor 13 are digitized in an A/D converter 14 and input to correlator 16'. The correlator 16' can be a cyclic correlator or a taped delay line. The incoming received chip stream is correlated by the correlator 16' by all of the different cyclic shifts. By means of the correlation the correlator 16' detects correlation peaks representing delays corresponding to estimated path delays $\tau 1$, $\tau 2$, . . . of a multipath propagation channel.

The amplitudes of the detected correlation peaks represent the amplitudes and phases of the estimated paths. The output signals of the correlator 16' are both supplied to a channel estimator 15 and a descrambling/despreading unit comprising a RAKE receiver 16. The descrambling/despreading unit 16 comprising a RAKE receiver is supplied with estimated tap coefficients (channel estimates) from the channel estimator 15. The output of the RAKE receiver in the descrambling/despreading unit 16 is passed through a deinterleaver 17, a channel decoder 18, a voice decoder 21 and is then D/A converted in a D/A converter 22. Finally the analog data is output on a terminal such as a telephone 23. Obviously digital data can be supplied directly from the channel decoder 18 for example to a video monitor 20 or a computer terminal 19.

With reference to FIG. 2, particularly the scrambling procedure will now be explained in detail.

In FIG. 2 the communication between a base station 24 and a mobile station 25 is shown. Particularly the downlink channel 26 from the base station 24 to the mobile station 25 and the uplink channel 27 between the mobile station 25 and the base station 24 are shown. The downlink channel 26 and the uplink channel 27 comprise different subchannels $D_1, \ldots D_N, D_{1'}, \ldots D_{N'}$. A first subset of the subchannels of the downlink channel 26 can for example be used for voice data and other subchannels can be used for the simultaneous transmission of video data. The data from the base station 24 are channelised (spread) with different spreading codes $C_{channel\ 1}, \ldots, C_{channel\ N}$, which are mutually orthogonal or bi-orthogonal 28, 30. The spread data are then scrambled 29, 31 with scrambling codes $C_{scramble\ 1}, \ldots, C_{scramble\ M}$. Therefore scrambling codes which are different, but need not to be mutually orthogonal or bi-orthogonal, are used within the same link, for example, the downlink 26. (The orthogonality requirements are satisfied by the spreading codes.)

For the uplink 27, either the same scrambling codes $C_{scramble\ 1}, \ldots C_{scramble\ M}$ as in the case of the downlink 26, or another group of scrambling codes $C_{scramble\ 1}, \ldots C_{scramble\ M}$ or, as generally the uplink channel 27 demands for the same high bit rate as the downlink channel 26, even just one scrambling code can be used.

As it has already been set forth above, the downlink channel 26 or the uplink channel 27 can comprise subchannels for video and/or voice transmission. Different scrambling codes can be allocated for the scrambling of the channels demanding for a high bit rate, as it is the case, for example, for the transmission of video data. For transmission of, for example, voice data, only one scrambling code can be used.

Regarding the details of the spreading and scrambling process, particularly the modulo-2 sum operation for the scrambling at the transmission side and the multiplying operation for the descrambling at the reception side, the above-cited documents WO 96/05668 A1 and EP-A-565 506 are incorporated by reference. Particularly FIGS. 1 and 2 in the corresponding description (page 14 to page 19) of WO 96/05668 A1 are incorporated by reference.

The spreading codes can be generated for example by a code tree. This technique is known from Adachi, "Tree-structured generation of orthogonal spreading codes with different lengths for forward link of DS-CDMA mobile radio", Electronics Letters, January 1997, Vol.33, No. 1, page 27, 28, which is incorporated herewith by reference.

Orthogonal spreading codes with different lengths can be generated by a tree-structure for orthogonal multiplexing of forward-link code-channels of different data rates in direct sequence code division multiple access DS-CDMA mobile radio. Thereby codes of the same layer of the tree constitute a set of Walsh functions and are orthogonal.

Furthermore, any two codes of different layers of the tree structure are also orthogonal except for the case that one of the two codes is a mother code of the other.

As it has already been set forth in the introductory portion, when only one scrambling code (or long code) is used per link, there are restrictions of the combinations of codes which can be used for the orthogonal codes (see Adachi et al.) These restrictions may prevent a user from being allocated to a certain channel. These restrictions are especially important for high data rate users. Furthermore the highest data rate is restricted to the shortest orthogonal code.

As according to the technique set forth above, two or more scrambling codes are assigned to one link (one user), the following advantages are achieved:

the highest data rate is increased since the data rate can be split over at least two scrambling codes. Therefore a higher data rate service on one link (uplink or downlink) can be provided by using a plurality of scrambling codes within one link. In this way the same channelisation codes (spreading codes) can be reused and a higher data rate can be supported because the highest data rate is restricted by the set of channelisation codes (spreading codes) with the shortest link.

By only using two scrambling codes (M=2) per link (user), the total number of available channelisation codes (spreading codes) can be doubled and the maximum data rate can also be doubled.

FIG. 4 shows a symbolized cell distribution of a wireless transmission system. One cell $C_1$ is surrounded by six other hexagonal cells $C_2, \ldots, C_7$. A total number of, for example, 512 different scrambling codes can be used. To avoid interference between adjacent cells, the total number of 512 scrambling codes can for example be divided by 7 and each cell $C_1, \ldots, C_7$ can be allocated a subset of said scrambling codes. Different users within one cell can use different scrambling codes allocated to the respective cell.

As it has already been set forth above, one scrambling code can be used in conjunction with a set of channelisation codes (spreading codes) depending upon the required data rate and services required. Adjacent base stations can use different scrambling codes and every base station uses a set of scrambling codes to maintain different links in each cell.

To increase the flexibility of code assignment and increase the usage of the codes and the code tree, it is proposed to use as an option more than one scrambling code per link.

FIG. 5 shows an application of the technique set forth above. According to FIG. 5 the technique is used to provide an increased data rate, for example, for a WCDMA system. To increase the data rate normally in WCDMA one or both of the following approaches are required:

reduction of processing gain, and increase of chip rate (enhanced bandwidth)

By utilizing the scheme as shown in FIG. 5 the data rate can be increased by combining more than one scrambling code. The example shows the data rate at 4 Mbit/s, but obviously higher rates can be achieved by using more than one scrambling code.

Now a receiver technology according to the present invention for a transmission system utilizing CDMA modulation, a plurality of spreading codes per link and only one scrambling code per link will be explained with reference to FIG. 6. The receiver technology implements the descrambling and despreading shown in FIG. 1 and designated by the reference sign 16.

The receiver technology as shown with reference to FIG. 6 is designed to cope with transmission systems utilizing more than one scrambling code per link to alleviate the problem of channelisation code restriction and also to provide a higher data rate service on one link (uplink or downlink). In this way the same channelisation code can be reused and a higher data rate can be supported because the highest data rate is restricted by the set of channelisation codes (spreading codes) with the shortest length. When reusing one and the same channelisation code for spreading the two different data streams transmitted in one link and scrambling these two data streams by two different scrambling codes, the complexity of the receiver can be reduced as shown with reference to FIG. 6 as complex RAKE receivers can be suppressed as according to the present invention only one RAKE receiver 16 is necessary.

With reference to FIG. 7 the internal structure of a modified RAKE receiver according to the present invention will be explained.

As it has already been explained, the RAKE receiver 16 is supplied (additionally to the information bits) both with delay information $\tau1, \tau2, \ldots, \tau_n$ corresponding to the position of the correlation peaks detected by the correlator 16' and tap coefficients (estimation values) from the channel estimator 15 input to a multiplication circuits 51 of the RAKE receiver 16.

As shown in FIG. 7 the output signals of the correlator 16' are supplied with corresponding delays $\tau1, \tau2, \ldots, \tau_n$ provided by a delay line 42, 43 to a plurality of so called RAKE taps of the RAKE receiver 16. (In FIG. 8 two RAKE taps are depicted for a schematic representation of the RAKE receiver. Generally the RAKE receiver comprises n RAKE taps and (n−1) delay units, n being an integer larger than 1). The delays $\tau1, \tau2, \ldots, \tau_n$ correspond to the estimated delays of the multipath channel as they are detected by the correlator 16'.

In FIG. 7 two RAKE taps are shown schematically. Generally the receiver comprises n RAKE taps, n being an integer larger than 1. Each of the RAKE taps comprises despreading units 44, 45 using common chanelisation codes. The output of the despreading units 44, 45 is respectively divided into a plurality of parallel streams wherein the number of streams corresponds to the number of different scrambling codes used per link. Each of the parallel streams is passed to a corresponding descrambling unit 46, 47, 48, 49 multiplying the output of the despreading units 44, 45 by the respective scrambling code used in the stream. In each RAKE tap comprising one despreading unit 44, 45 a set of k descrambling units 46, 47, 48, 49 is provided, the descrambling units belonging to the same set being respectively supplied with the output of the same despreading unit k thereby is an integer larger than 1. Each set of k descrambling units 46, 47, 48, 49 uses the same k descrambling codes used in the link.

Therefore in each RAKE tap the output of the respective despreading unit is descrambled with the same set of k different descrambling codes.

The output of the descrambling units 46, 47, 48, 49 is then respectively passed to an adding circuit 50 summing up all chips of a symbol.

The respective outputs of the adding circuits 50 is then passed to multiplying circuits 51 where they are multiplied with the complex conjugate of the estimated channel coefficients supplied from the channel estimator 15. Respectively n (number of RAKE taps) outputs of the multiplying circuits 51 are then combined in one RAKE combiner 52 as shown in FIG. 7. The RAKE combiner 52, 53 output the signals $output_1, \ldots, output_k$.

Respectively one RAKE combiner 52, 53 is provided with the output of n, in the shown example two, multiplying circuits belonging to different RAKE taps (different despreading units) but at the same time belonging to streams with descrambling units using the same descrambling code. Therefore, in the example shown in FIG. 7, k RAKE combiner 52, 53 are provided corresponding to the number of streams of one RAKE tap and hence to the number k of different scrambling codes used per link. For example, the RAKE combiner 52 combines n outputs of the parallel streams having been descrambled in the descrambling units with the same scrambling code $C_{SCRAMB1}$. The RAKE combiner 53 combines n outputs having been descrambled in the descrambling units with the same scrambling code $C_{SCRAMBk}$.

With other words, on the receiver side, see FIG. 7, the incoming data is passed to a delay line (two delay units 42, 42 are depicted in FIG. 8) which forms part of a modified RAKE receiver. From specific delays of the delay line, the signal is despread using the common channelisation codes and then further split into a number of streams corresponding to the number of scrambling codes used in the link. Each stream is then multiplied by the respective scrambling code used in the stream and the resulting signal is passed to the complex conjugate of the estimated channel coefficient supplied from the channel estimator 15 and then passed to a RAKE combiner.

Therefore the present invention provides for the following advantages:

lower complexity of the receiver structure, and more efficient usage of the available RAKE receivers.

What is claimed is:

1. Receiver for detecting information symbols transmitted according to a CDMA technique, according to which CDMA technique the information symbols are spread with different spreading codes and scrambled with different scrambling codes, on the transmission side, the receiver comprising:

a plurality of despreading units (44, 45) for despreading an input data bitstream with said different spreading codes, said input data being supplied to the despreading units (44, 45) by means of a delay line (42, 43), and a set of k descrambling units (46, 47, 48, 49) per despreading unit (44, 45), k being an integer larger than 1, respectively k descrambling units (46, 47, 48, 49) being supplied with the output signal of one despreading unit (44, 45);

whereby said k descrambling units are supplied with respective ones of k scrambling codes;

whereby the output of each despreading unit is divided into a plurality of parallel streams and each one of said parallel streams is passed to a respective set of k descrambling units.

2. Receiver for detecting information symbols transmitted according to a CDMA technique, according to which CDMA technique the information symbols are spread with different spreading codes and scrambled with different scrambling codes, on the transmission side, the receiver comprising:

at least one despreading unit (44, 45) for despreading an input data bitstream with said different spreading codes, a set of k descrambling units (46, 47, 48, 49) per despreading unit (44, 45), k being an integer larger than 1, respectively k descrambling units (46, 47, 48, 49) being supplied with the output signal of one despreading unit (44, 45), and a channel estimator (15) for generating channel estimation values, multiplying circuits for multiplying data based on the output of a descrambling unit (46, 47, 48, 49) with the channel estimation values supplied from the channel estimator (15);

whereby said k descrambling units are supplied with respective ones of k scrambling codes;

whereby the output of each despreading unit is divided into a plurality of parallel streams and each one of said parallel streams is passed to a respective set of k descrambling units.

3. Receiver according to claim 2, characterized in that a plurality of RAKE combiner (52, 53) is provided being respectively supplied with the output of n multiplying circuits (51) associated with different despreading units (44, 45) but with descrambling units (46, 47, 48, 49) using the same descrambling code, wherein n is the number of RAKE taps and larger than 1.

4. Receiver according to claim 3, characterized in that a number k of RAKE combiner is provided, k being the number of different scrambling codes used per link and being larger than 1.

5. Mobile communications device, characterized in that it comprises a receiver according to claim 1.

6. Mobile communications device, characterized in that it is a mobile station for a CDMA transmission system and comprises a receiver according to claim 1.

7. Method for detecting information symbols transmitted according to a CDMA technique, according to which CDMA technique the information symbols are spread with different spreading codes and scrambled with different scrambling codes, on the transmission side, the method comprising the following steps:

despreading (44, 45) an input data bitstream with said different spreading codes, said despreading including a plurality of steps, and said input data being supplied through a delay line, and a set of k descrambling steps (46, 47, 48, 49) per despreading step (44, 45), k being an integer larger than 1, respectively k descrambling steps (46, 47, 48, 49) being supplied with the output of one despreading step (44, 45);

whereby said k descrambling steps include the use of respective ones of k scrambling codes;

whereby the output of said despreading step is divided into a plurality of parallel streams and each one of said parallel streams is processed by a respective set of k descrambling codes.

8. Method for detecting information symbols transmitted according to a CDMA technique, according to which CDMA technique the information symbols are spread with different spreading codes and scrambled with different scrambling codes, on the transmission side, the method comprising the following steps:

despreading (44, 45) an input data bitstream with said different spreading codes, a set of k descrambling steps (46, 47, 48, 49) per despreading step (44, 45), k being an integer larger than 1, respectively k descrambling steps (46, 47, 48, 49) being supplied with the output of one despreading step (44, 45), generating channel estimation values, and multiplying data based on the output of a descrambling unit (46, 47, 48, 49) with the channel estimation values supplied from the channel estimation value generation step (15);

whereby said k descrambling steps include the use of respective ones of k scrambling codes;

whereby the output of said despreading step is divided into a plurality of parallel streams and each one of said parallel streams is processed by a respective set of k descrambling codes.

9. Method according to claim 8, characterized by, a plurality of RAKE combining steps (52, 53) respectively supplied with the output of n multiplying steps (51) associated with different despreading steps (44, 45) but with descrambling steps (46, 47, 48, 49) using the same descrambling code, wherein n is the number of RAKE taps and larger than 1.

10. Method according to claim 9, characterized in that a number k of RAKE combining steps is provided, k being the number of different scrambling codes used per link and being larger than 1.

* * * * *